E. BURLINGAME.
Apparatus for Making Vinegar.

No. 167,643. Patented Sept. 14, 1875.

Witnesses.
Frank H. Arnold
Horace N. Foster

Inventor.
Edward Burlingame
By Atty Benjamin Arnold

UNITED STATES PATENT OFFICE.

EDWARD BURLINGAME, OF CENTREVILLE, RHODE ISLAND.

IMPROVEMENT IN APPARATUS FOR MAKING VINEGAR.

Specification forming part of Letters Patent No. 167,643, dated September 14, 1875; application filed August 1, 1874.

*To all whom it may concern:*

Be it known that I, EDWARD BURLINGAME, of Centreville, in the county of Kent and State of Rhode Island, have invented an Apparatus for Making Vinegar, of which the following is a specification:

The object of my invention is to facilitate the process of making vinegar by forcing air through the wort or mixture of which the vinegar is made. This I accomplish by means of radiating tubes placed in the bottom of the wort-vessel, these tubes being furnished with fine holes, through which the air is forced; also, to save the alcohol that is evaporated from the mixture, and return it to the same, which is done by combining with the wort-vessel a condensing-worm, elevated so as to cause any fluid condensed in it to run back into the wort-vessel.

Figure 1:
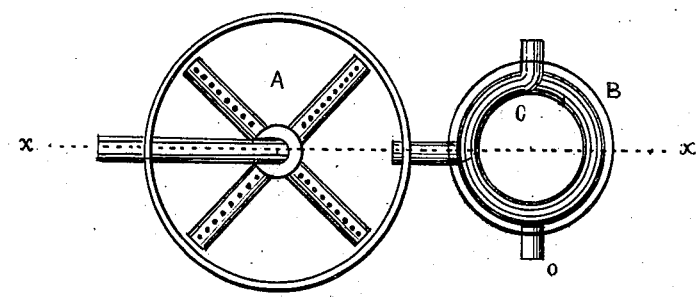
Figure 2:
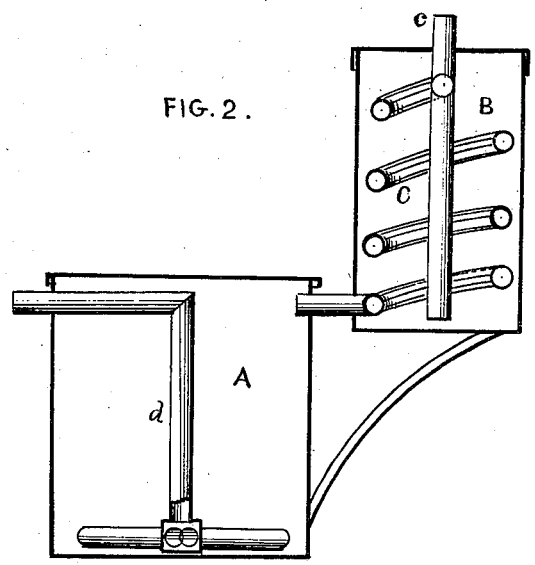

Figure 1 shows a top view of the apparatus with the covers removed. Fig. 2 is a vertical cross-section taken through the line $x$ $x$, Fig. 1.

A is the vessel that holds the wash, wort, or mixture of which the vinegar is to be made. A tube, $d$, passes in through one side near the top, and, continuing down to the bottom of the vessel, terminates in four radiating arms, closed at their outer ends, and perforated with fine holes on their sides. C is a condensing-worm contained in the vessel B, the lower end of the worm passing through the side of the vessel B into the vessel A, and the whole worm is placed high enough to cause any fluid in it to flow back into the vessel A. The upper end of the worm passes out near the top of the vessel B. A pipe, $c$, is put in the cover of the vessel B, to convey cold water to the bottom of the vessel to cool the worm, and a discharge-pipe, $o$, is made for the water to run off to cause a circulation in the vessel.

The operation is as follows: The wort or mixture, which may be any of the kinds used in making vinegar, is put into the vessel A, and the cover secured tight. Air, which may be heated, is then forced in through the tube $d$, and, escaping through the fine holes in the arms, brings the oxygen that is necessary for the acidification of the mixture in immediate contact with all parts of it, and at the same time, if the air is heated, raises the temperature of the mixture to that point that is most favorable for the formation of the vinegar. The alcohol that is evaporated by the increased temperature of the wort passes up into the worm C, which, being kept cool by the circulation of cold water through the vessel around it, condenses it, and it runs back into the vessel A, to be finally turned into vinegar.

I claim as my invention—

As an improvement in apparatus for the manufacture of vinegar, the vessel B, provided with the worm C, in combination with the vessel A and tube $d$, having radiating perforated arms, substantially as and for the purpose specified.

EDWARD BURLINGAME.

Witnesses:
 JOHN C. NICHOLS,
 HORACE N. FOSTER.